United States Patent [19]

Walczak

[11] Patent Number: 4,566,739
[45] Date of Patent: Jan. 28, 1986

[54] CROSS-SLIDE GUIDE FOR A MICROFILM READER

[75] Inventor: Andrzej Walczak, Ober-Morlen, Fed. Rep. of Germany

[73] Assignee: Map Mikrofilm Apparatebau Dr. Poehler GmbH & Co. Kg, Fed. Rep. of Germany

[21] Appl. No.: 637,271

[22] Filed: Aug. 3, 1984

[30] Foreign Application Priority Data

Aug. 10, 1983 [DE] Fed. Rep. of Germany ....... 3328800

[51] Int. Cl.$^4$ ............................................. F16C 29/02
[52] U.S. Cl. .................................................. 308/3 R
[58] Field of Search ...................... 308/3 R, 3 A, 3.6; 248/429, 430; 33/1 M; 108/143; 312/341 NR

[56] References Cited

U.S. PATENT DOCUMENTS

| | | |
|---|---|---|
| 2,646,333 | 7/1953 | Abrahamson et al. ......... 308/3.6 X |
| 3,363,960 | 1/1968 | Reiss et al. ........................ 308/3.6 X |
| 3,822,090 | 7/1974 | Mak et al. ............................... 353/27 |
| 4,319,496 | 3/1982 | Yanaga ............................. 308/4 R X |
| 4,320,943 | 3/1982 | Link ................................... 33/1 M X |

*Primary Examiner*—Stuart S. Levy
*Assistant Examiner*—David Werner
*Attorney, Agent, or Firm*—Cantor and Lessler

[57] ABSTRACT

Guide rails having a guide section greater in width than in height with rectangular cross-section are provided for a cross-slide guide. Arcuate guide surfaces of sliding pads embrace the guide section in such a manner that they make contact with the two upper longitudinal edges of the guide section and a lower portion of the sliding pads reaches under the guide section with clearance between the two parts. This provision allows the sliding pads to slide smoothly along the guide section and to follow the direction of the guide rails.

6 Claims, 2 Drawing Figures

CROSS-SLIDE GUIDE FOR A MICROFILM READER

BACKGROUND OF THE INVENTION

This invention relates to a cross-slide guide, and in particular, this invention relates to a cross-slide guide for microfilm reader in which the slides located on sliding pads can be transversed on at least one guide rail on which they are supported. Such a type of cross-slide guide is described in U.S. Pat. No. 3,822,090 for instance.

Cross-slides render it possible to shift the film holder of a microfilm reader in both coordinate directions, so that any desired frame of the microfiche can be slid into the illuminated area below the lens. Nowadays rolling friction and sliding friction are utilized in order to attain this movability of the film holder. The advantage of rolling friction rests with the fact that the expenditure of force required is lower than with sliding friction. This advantage, however, often turns into a disadvantage in case of a microfilm reader with a greater magnification ratio, since the film holder responds too sensitively, resulting in the frame beginning to slightly bounce on the film holder. Both for cross-slide guides using rolling friction and those using sliding friction, numerous designs are commonly known to the art.

SUMMARY OF THE INVENTION

This invention is based on the objective of developing a cross-slide guide of the type identified above that is especially cheap to manufacture and that imposes very little demands on the dimensional accuracy required from the cross-slide guide.

This objective is accomplished by providing a cross-slide guide in which the slides located on sliding pads can be traversed on at least one guide rail on which they are supported. The cross-slide guide is characterized by the following provisions:

(a) the guide rails have a guide section of greater width than height with rectangular cross-section, (b) the sliding pads embrace the guide section by means of arcuate guide surfaces in such a manner that their guide surfaces make contact with the two upper longitudinal edges of the guide section and a lower portion of the sliding pads reaches under the guide section with clearance between the two parts.

For all the extreme design simplicity of the cross-slide guide of this invention, it is capable of making for smooth and accurate guiding of the film holder. The smoothness in guiding and the few demands imposed on the dimensional accuracy are above all brought about by the sliding pads making contact with the two upper longitudinal edges of the guide section only. Hence, there is no large contact surface between the sliding pads and the guide section. Since the sliding pads also reach under the guide section, it is impossible for the cross-slide to be lifted off towards the top by accident. As in the case with cross-slide guides known to date, the cross-slide guide of this invention needs only one guide rail for each of the two slides. It is sufficient for each slide to be supported on one locating surface on which it can slide, with the latter being opposite the guide rail. Of course, the cross-slide guide of this invention is also suitable when two guide rails are provided for each slide and when the slides are supported on the guide rails via four or only three sliding pads altogether.

The very flat design of the cross-slide guide of this invention deserves being pointed out. Since the sliding pads can easily be manufactured from plastic material having a tough and hard structure by means of injection-moulding, the manufacturing costs of the cross-slide guide of the invention are extremely low. Furthermore, mention has to be made of the absence of play due to the arcuate guide surfaces of the sliding pads and due to the low friction.

It is advantageous for the guide surfaces of each sliding pad to be domed in the direction of the longitudinal axis of the guide rail. This provision adds to the smoothness of the cross-slide guide. Domed guide surfaces furthermore allow a reduction of the demands imposed on the parallelism of the guide rails and on the accurate alignment of the sliding pads in relation to the guide rails.

A further favorable embodiment of the invention is that the sliding pads are made from an elastic plastic material and that they are dimensioned to be capable of snapping over the guide section from above. A cross-slide featuring such sliding pads can be mounted with special ease, since the slides need not be pushed on the rails from the side.

The sliding pads align in relation to the guide section when connected to the respective slide of the cross-slide guide in such a manner that they are capable of limited pivotal motion about a vertical axis, the pivotal motion being limited by the constructional tolerances of the various elements of the cross-slide guide.

The two slides forming one cross-slide can be connected to the required number of sliding pads with special ease by means of a vertically upstanding fixing pin integral with the sliding pad and cooperating with a mounting hole in the slide.

In the case of the cross-slide guide having two guide rails per slide and the slides being located on four sliding pads altogether supported on two guide rails, it is advantageous for the guide rails to be attached to a support by means of elastic adhesive tape giving them limited movability, because in this case the guide rails can slightly move when the slide is being traversed, allowing them to compensate for variations in parallelism and in height. The guide rails automatically align parallel to each other, always offering the slides an even contact surface.

BRIEF DESCRIPTION OF THE DRAWING

Various embodiments are possible on the basis of the invention. In order to understand their basic principle, one embodiment is exemplified in the following detailed description and illustrated in the appended drawing wherein.

DESCRIPTION OF THE PREFERRED EMBODIMENT

Figure 1:
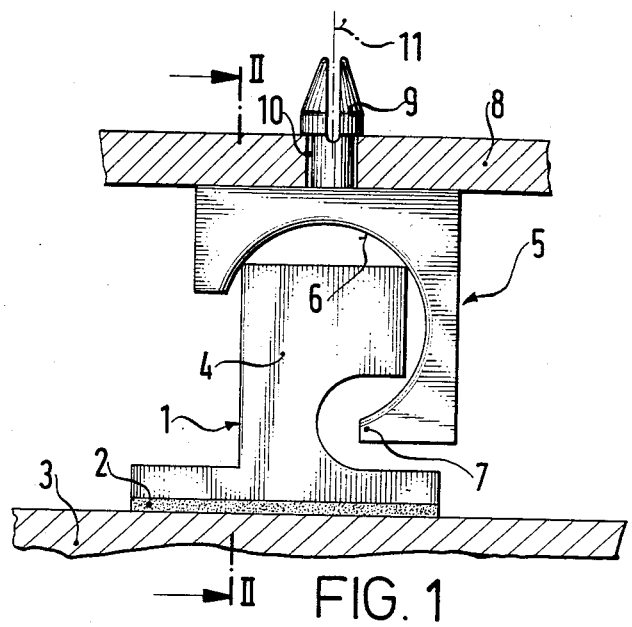
FIG. 1 is an elevational view of a cross-section through one portion of the cross-slide guide relating to the invention.

FIG. 1 shows a guide rail 1 attached to a support 3 by means of elastic adhesive tape 2. The guide rail 1 comprises a guide section 4 of greater width than height with rectangular cross-section.

Figure 2:
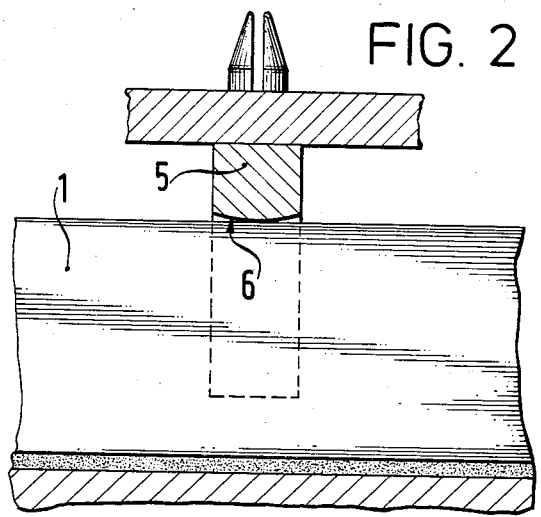
FIG. 2 is a sectional view along the line II—II of FIG. 1.

A sliding pad 5 is disposed on the guide section 4. The sliding pad 5 embraces the guide section 4 by means of an arcuate guide surface 6, with the lower portion 7 reaching under the guide section 4. Hence, it is impossible for the sliding pad 5 to be lifted off the guide section 4. FIG. 2 reveals that the guide surface 6 is domed in the direction of the longitudinal axis of the guide section 4. This results in the guide surface 6 of the sliding pad 5 only making point contact with the two upper longitudinal edges of the guide section 4.

An integral fixing pin 9 is provided on top of the sliding pad 5, to connect the latter to a slide 8 to be guided. The fixing pin 9 comprises a lower portion having a length approximately equal to the thickness of the pad 8 passing through a bore 10, and a head portion which is larger in diameter than the lower portion, thereby forming a shoulder to lock the slide 8 in place on the pad 5. The fixing pin 9 is dimensioned to allow the sliding pad 5 to pivot about a vertical axis when the fixing pin 9 has arrested behind the bore 10.

Normally two guide rails 1 are provided for each slide with the former supporting the slide located on four sliding pads 5 altogether. Of course, a three point support is possible as well. Another design variant might provide for the slide being guided on one guide rail only and being supported only on one locating surface on which it can slide with the latter being opposite to the guide rail.

Final mention be made of the guide rail 1 not necessarily having to be asymmetrical as shown in the drawing. The guide rail 1 can also be symmetrical. In such a case the sliding pad 5 has two lower portions 7 which reach under the guide section 4 on both sides. Hence, it is more difficult for the sliding pad to be lifted off the guide rail 1. Snapping the sliding pads 5 onto the guide rail 1 can be effected with special ease when the bottom surfaces of the two lower portions are inclined in such a manner that the lower portions 7 automatically widen when the sliding pads 5 are being pushed onto the guide rail 1 from above.

I claim:
1. A cross-slide guide in which slides located on sliding pads can be traversed on at least one guide rail on which they are supported, the cross-slide guide comprising:
    (a) at least one elongated guide rail having, at the upper portion thereof, a guide section of greater width than height with rectangular cross-section, and having an undercut on at least one side below said guide section;
    (b) a sliding pad having an inner arcuate guide surface slidingly resting on said guide section and embracing the guide section in such a manner that said guide surface makes contact only with the two upper longitudinal edges of the guide section, and having a lower portion reaching under the guide section into said undercut with clearance between said guide rail and said guide surface.

2. A cross-slide guide according to claim 1, wherein the guide surface is domed in the direction of the longitudinal axis of the guide rail whereby said guide surface makes contact with said guide section only at two points.

3. A cross-slide guide according to claim 1, wherein the sliding pads are made of an elastic plastic material and dimensioned to be capable of snapping over the guide section from above.

4. A cross-slide guide according to claim 1, wherein the sliding pads are mounted to the respective slide of the cross-slide guide and are capable of pivoting about a vertical axis.

5. A cross-slide guide according to claim 1, further comprising an upstanding integral fixing pin on said sliding pad for fixing the slide to the same.

6. A cross-slide guide according to claim 1, wherein at least two guide rails embraced by sliding pads are provided for each slide, and further comprising the guide rails being mounted to a base with elastic adhesive tape to thereby allow limited movability of the guide rails.

* * * * *